United States Patent

Ohya et al.

(10) Patent No.: US 9,170,934 B2
(45) Date of Patent: Oct. 27, 2015

(54) SERVER AND DRIVE CONTROL DEVICE

(71) Applicant: Kabushiki Kaisha Toshiba, Tokyo (JP)

(72) Inventors: Yasuo Ohya, Tokyo (JP); Dimas Rinarsoputro, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 147 days.

(21) Appl. No.: 13/774,016

(22) Filed: Feb. 22, 2013

(65) Prior Publication Data

US 2013/0339578 A1  Dec. 19, 2013

(30) Foreign Application Priority Data

Jun. 14, 2012 (JP) ................................ 2012-134461

(51) Int. Cl.
    *G06F 12/00* (2006.01)
    *G06F 12/02* (2006.01)
    *G06F 12/08* (2006.01)
    *G06F 3/06* (2006.01)

(52) U.S. Cl.
    CPC .............. *G06F 12/0246* (2013.01); *G06F 3/06* (2013.01); *G06F 12/0862* (2013.01); *G06F 12/0866* (2013.01); *G06F 12/0871* (2013.01); *G06F 12/0888* (2013.01); *G06F 2212/7203* (2013.01)

(58) Field of Classification Search
    None
    See application file for complete search history.

(56) References Cited

U.S. PATENT DOCUMENTS

2009/0077304 A1* 3/2009 Hong et al. .................... 711/103
2011/0202716 A1* 8/2011 Nakagawa ..................... 711/113

FOREIGN PATENT DOCUMENTS

| JP | 5-292476 A | 11/1993 |
| JP | 5-307483 A | 11/1993 |
| JP | 2006-126893 A | 5/2006 |
| JP | 2012-22508 | 2/2012 |

OTHER PUBLICATIONS

Office Action issued Apr. 30, 2014 in Japanese Patent Application No. 2012-134461 (with English language translation).

* cited by examiner

*Primary Examiner* — Shawn X Gu
(74) *Attorney, Agent, or Firm* — Oblon, McClelland, Maier & Neustadt, L.L.P.

(57) ABSTRACT

According to one embodiment, a drive control device includes a monitor, data memory and a controller. The monitor monitors an operating state of a solid-state drive and detects whether the solid-state drive is busy. The data memory is capable of holding temporarily a write target data which should be written to the solid-state drive or a read target data which was read from the solid-state drive and should be transmitted to a requestor. The controller which writes the write target data to the data memory when the controller receives a write request and the monitor detects that the solid-state drive is busy, and which writes the write target data held in the data memory to the solid-state drive after the solid-state drive becomes not busy.

9 Claims, 6 Drawing Sheets

SERVER AND DRIVE CONTROL DEVICE

CROSS-REFERENCE TO RELATED APPLICATION(S)

This application is based upon and claims the benefit of priority from the prior Japanese Patent Application No. 2012-134461, filed on Jun. 14, 2012, the entire contents of which are incorporated herein by reference.

FIELD

Embodiments of the present invention relate to a server for distributing contents, such as image and music, to a user, for example, and a drive control device.

BACKGROUND

In recent years, the service which distributes contents, such as image and music, using a network has already started.

This kind of service requires to distribute contents in real time for a user's request, that is, real-time nature. For this reason, the server which distributes the contents stored in a storage device also requires a high speed and stable performance in reading the contents from the storage device and writing the contents to the storage device.

In these days, from a viewpoint of a high speed and stability, a solid-state drive (it is called "SSD" hereinafter) which uses a flash memory may be used for the storage device.

The SSD has a feature of a fast average data access speed and a low power consumption operation as compared with a hard disk drive (it is called "HDD" hereinafter). On the other hand, as for the SSD in which writing and erasing were repeated and which has been used for a long period of time, it is known that a writing speed will become slow compared with a writing speed of first data writing.

This is because a wear leveling (equalization of writing) and a garbage collection (releasing of an unnecessary data area) are performed as internal processing of the SSD.

When reading continuous data of image, music, etc. from the SSD, if writing of another data is simultaneously performed, the data may be unable to be read stably.

That is, when writing of a certain data takes time, reading of another data may be kept waiting in the meantime. This is not desirable when taking out a continuous data of image, music, etc. In order to reduce this influence, there is a method of reading and writing a data stably in appearance, by having a cache memory in an inside of the SSD.

However, when performing a writing of a data in the midst of read-out of a large amount of continuous data, a bigger cache memory must be prepared for an inside of the SSD by customization. Customization of the SSD is not preferred in respect of cost. It is desirable to use a general-purpose SSD, if possible.

When using the general-purpose SSD for a storage device, since a controller inside the SSD may perform the wear leveling and the garbage collection autonomously, a delay problem peculiar to the SSD will certainly occur.

In addition, since delay of a reading and writing within a definite period of time in a storage device is not treated as a fault, it is not complemented with a redundant data. This is very inconvenient to take out a data continuously in video delivery etc.

DETAILED EMBODIMENT

According to one embodiment, a drive controller includes a monitor, a data memory and a controller. The monitor monitors an operating state of a solid-state drive and detects whether the solid-state drive is busy. The data memory is capable of holding temporarily a write target data which should be written to the solid-state drive or a read target data which was read from the solid-state drive and should be transmitted to a requestor. The controller which writes the write target data to the data memory when the controller receives a write request and the monitor detects that the solid-state drive is busy, and which writes the write data held in the data memory to the solid-state drive after the solid-state drive becomes not busy.

Hereinafter, embodiments are described with reference to the drawings.

First Embodiment

Figure 1:
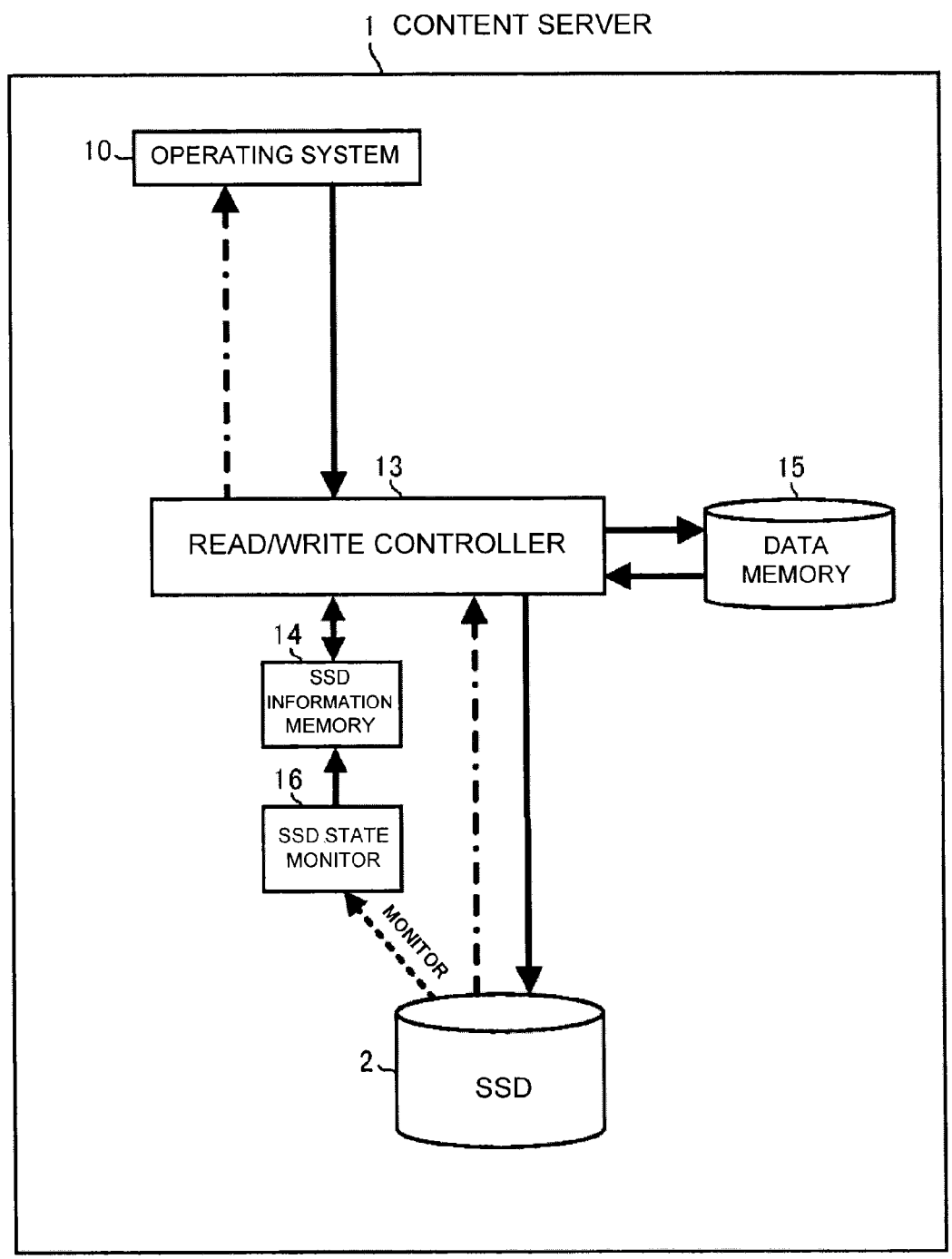
FIG. 1 shows the configuration of a content server of a first embodiment.

FIG. 1 shows the configuration of a content server for delivering video of a first embodiment. The content server 1 of the first embodiment is a computer provided with a hard disk drive, a memory, a CPU, an external communication interface, etc.

As shown in FIG. 1, functionally, this content server 1 is provided with an SSD 2, an operating system 10 (it is called "OS 10", hereinafter), a read/write controller 13 as a controller, an SSD information memory 14 as an operating state memory, a data memory 15, and an SSD state monitor 16, etc.

The OS 10 is basic software installed in the hard disk drive, and it generates a request, such as a data read request and a data write request.

For example, in response to instructions from a user of a client terminal (a requestor) connected to a network, the OS 10 sends the data read request to the SSD 2, and delivers a data obtained from the SSD 2 to the requestor through the network. Thus, the OS 10 realizes a video-delivery function by the content server 1.

The SSD 2 includes a flash memory. In response to the request from the OS 10, the SSD 2 reads a data stored in the flash memory, and writes a data to the flash memory. Here, the data is video contents, such as a movie used for video-delivery service etc., for example. In addition, the data may be other contents, such as music.

In the SSD information memory 14, an operating state of the SSD 2 can be set. That is, the SSD information memory 14 stores the operating state of the SSD 2. The operating state is during writing, during reading, during performing internal process, standby etc., for example. Since the SSD 2 cannot be accessed from the exterior during writing, reading and performing internal process, the SSD 2 is busy in these operation states.

The SSD state monitor 16 always monitors the SSD 2 to detect the operating state (busy or not) of the SSD 2, and sets the operating state in the SSD information memory 14. That is, the SSD state monitor 16 functions as a monitor which monitors the operating state of the SSD 2 and detects whether the SSD 2 is busy or not.

The data memory 15 is capable of holding temporarily a data which should be written to the SSD 2 or a data which was read from the SSD 2 and should be transmitted to the requestor.

The read/write controller 13 checks settings of the operating state of the SSD 2 stored in the SSD information memory 14 when the read/write controller 13 receives the write request or the read request from the OS 10.

When the request is the write request and the SSD 2 is busy, the read/write controller 13 writes a write target data to the data memory 15, and the read/write controller 13 writes the write target data of the data memory 15 to the SSD 2 after the SSD 2 becomes not busy.

When the request is the write request and the SSD 2 is not busy, the read/write controller 13 writes the write target data to the SSD 2 directly, without performing writing of the write target data to the data memory 15 and reading of the write target data from the data memory 15.

Furthermore, when the request is the read request and the SSD 2 is busy, the read/write controller 13 reads a read target data which was read from the SSD 2 beforehand and is held in the data memory 15 from the data memory 15, and the OS 10 transmits the read target data to the requestor. In this case, it is premised on that there is a read request for a data which is preceded by one from the OS 10 in advance.

Figure 2:
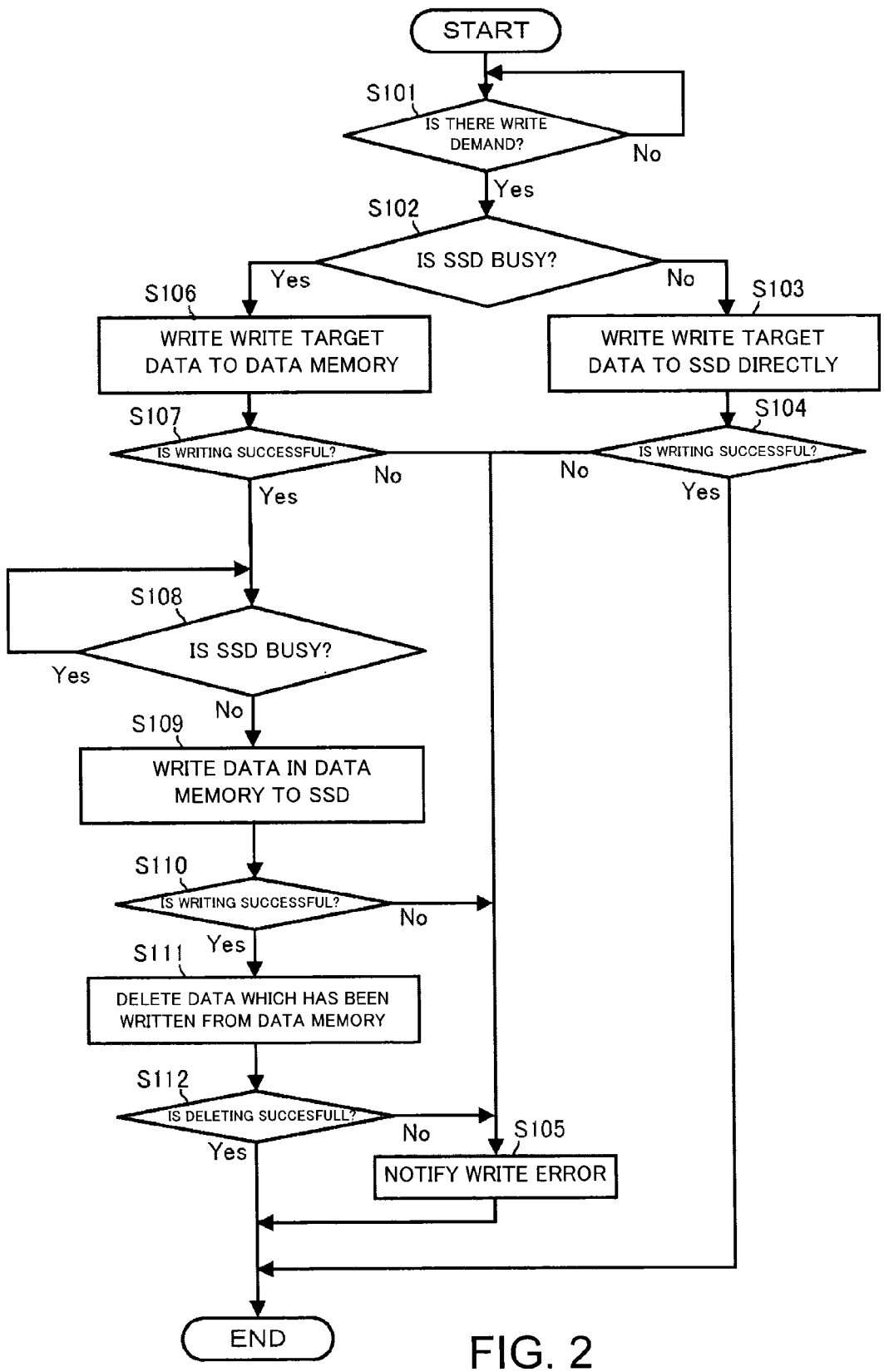
FIG. 2 shows a flow chart which shows a write operation of the content server of the first embodiment.
Figure 3:
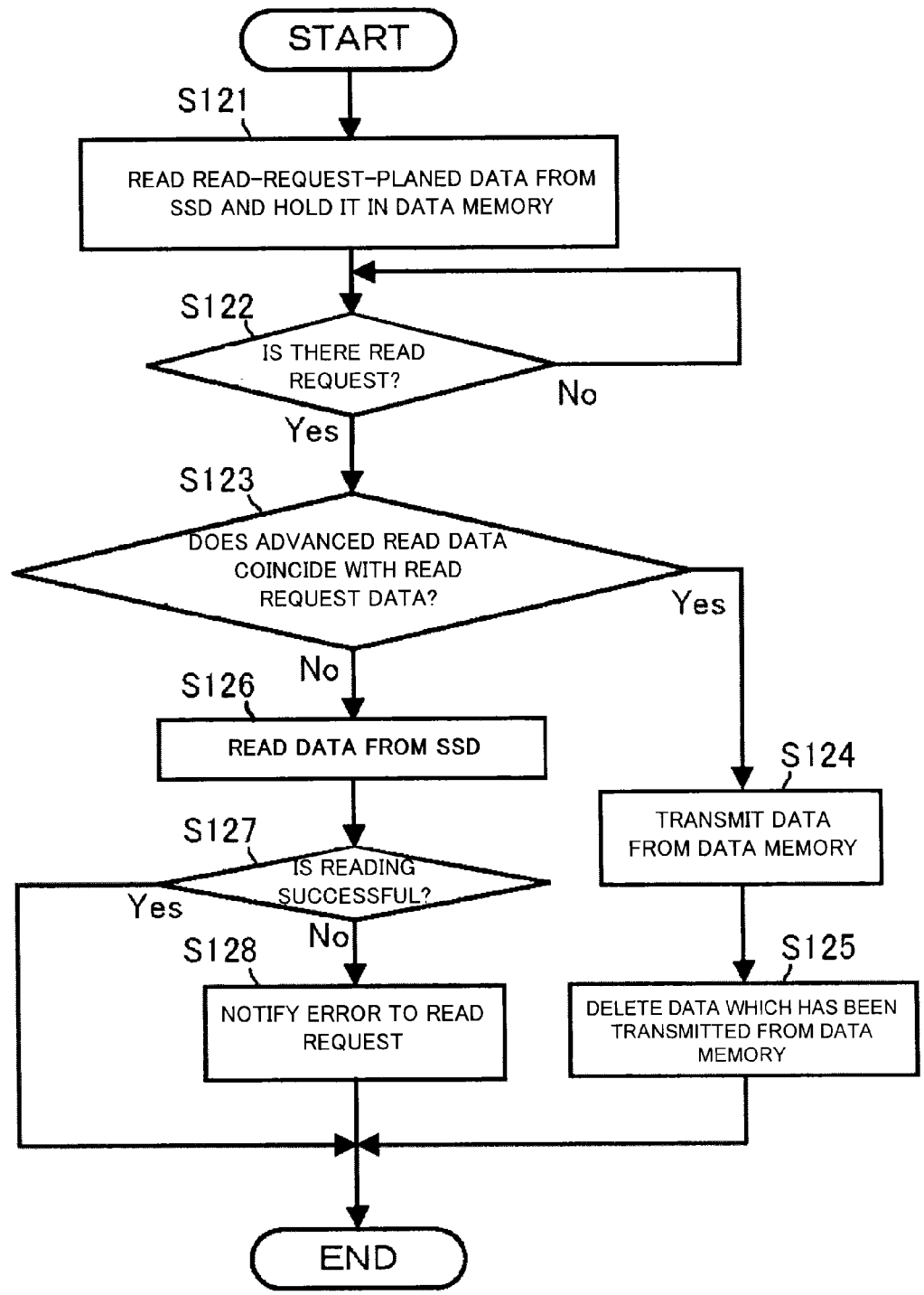
FIG. 3 shows a flow chart which shows a read operation of the content server of the first embodiment.

Then, the operation of the content server according to the first embodiment is explained with reference to flow charts of FIG. 2 to FIG. 4. The operation is explained on a first case where the data write request occurs, a second case where the read request occurs and a third case other than the first case and the second case.

<First Case where the Data Write Request Occurs>

The operation is explained with reference to FIG. 2. When the read/write controller 13 receives the data write request from the OS 10 (Yes of Step S101), the read/write controller 13 refers to the settings of the operating state of the SSD 2 stored in the SSD information memory 14, and checks the operating state of the SSD 2 (Step S102).

When the SSD 2 is not busy as a result of Step S102 (No of Step S102), the read/write controller 13 writes a write target data to the SSD 2 directly (Step S103).

And the read/write controller 13 checks a result of writing of the write target data (Step S104).

When the writing of the write target data failed and is not successful as a result of Step S104 (No of Step S104), a write error is notified to the OS 10 (Step S105).

When the writing of the write target data is successful as a result of Step S104 (Yes of Step S104), the read/write controller 13 ends a processing about this request.

On the other hand, when the SSD 2 is busy as a result of Step S102 (Yes of Step S102), the read/write controller 13 writes the write target data to the data memory 15 (Step S106).

And the read/write controller 13 checks a result of a writing of the write target data (Step S107). When the writing of the write target data failed and is not successful as a result of Step S107 (No of Step S107), a write error is notified to the OS 10 (Step S105).

When the writing of the write target data is successful as a result of Step S107 (Yes of Step S107), the read/write controller 13 refers to the settings of the operating state of the SSD 2 stored in the SSD information memory 14, and checks the operating state of the SSD 2 (Step S108).

When the SSD 2 is not busy as a result of Step S108 (No of Step S108), the read/write controller 13 writes the write target data currently held in the data memory 15 to the SSD 2 (Step S109).

When the SSD 2 is busy as a result of Step S108 (Yes of Step S108), the read/write controller 13 waits for the SSD 2 being no longer busy.

Then, the read/write controller 13 checks a result of the writing of the write target data to the SSD 2 (Step S110).

When the writing of the write target data is successful as a result of Step S110 (Yes of Step S110), the read/write controller 13 deletes the write target data being held in the data memory 15 which has been written to the SSD 2 (Step S111).

When the writing of the write target data failed as a result of Step S110 (No of Step S110), a write error is notified to the OS 10 (Step S105).

The read/write controller 13 checks whether deletion of the write target data is successful (Step S112) after deleting the write target data.

When the deletion of the write target data is successful as a result of Step S112 (Yes of Step S112), a processing about this request is ended. When the deletion of the write target data failed as a result of Step S112 (Yes of Step S112), a write error is notified to the OS 10 (Step S105).

<Second Case where a Data Read Request Occurs>

The operation is explained with reference to FIG. 3. The read/write controller 13 receives beforehand a read request for an advanced data (temporary request) from the OS 10, reads from the SSD 2 a read-request-planned data (it is called "read-ahead data", hereinafter), and holds it to the data memory 15 (Step S121).

And when the read/write controller 13 receives the data read request from the OS 10 (Yes of Step S122), the read/write controller 13 checks whether the read target data is the same as the read-ahead data which is read beforehand (Step 123).

When the read target data coincides with the read-ahead data held in the data memory 15 as a result of Step 123 (Yes of Step S123), the read/write controller 13 reads the read target data from the data memory 15, and transmits it to the OS 10 (Step S124).

And the read/write controller 13 deletes the read-ahead data which was transmitted from the data memory 15 (Step 125).

On the other hand, when the read target data does not coincide with the read-ahead data held in the data memory 15 as a result of Step 123 (No of Step S123), the read/write controller 13 reads the read target data directly from the SSD 2 after checking the operating state of the SSD 2 (Step S126).

And the read/write controller 13 checks whether the read target data has been read normally (Step S127).

When read of the read target data is successful as a result of Step S127 (Yes of Step S127), the read/write controller 13 ends a processing about this request.

On the other hand, when read of the read target data fails and is not successful as a result of Step S127 (No of Step S127), the read/write controller 13 notifies an error to the read request to the OS 10 (Step S128). At this time, a result of the operation may be memorized or outputted as a log.

<Third Case Other than the First Case and the Second Case>

At timing without the data read request or the data write request from the OS 10, the read/write controller 13 checks whether a write target data which should be written to the SSD is in the data memory 15.

When the write target data which should be written to the SSD is held in the data memory 15 as a result of this check, the read/write controller 13 reads the write target data of the data memory 15 and writes it to the SSD 2.

And when writing of the write target data is successful, the read/write controller 13 deletes the write target data which has been written from the data memory 15.

When the writing of the write target data in the SSD 2 fails or deleting of the write target data which has been written from the data memory 15 fails, an error which shows a failure is notified to the read/write controller 13. And a result of the operation may be outputted to a log at this time.

Thus, according to this first embodiment, a content server using a general-purpose SSD which does not produce delay in read of contents can be provided, and a drive control device for a general-purpose SSD which has the read/write controller and does not produce delay in read of contents, can be provided.

Second Embodiment

A storage device in a general server for business use is constituted redundantly in many cases because a performance of data-keeping is a first priority matter. There is RAID1 (mirroring) as an example of a redundancy of storage device.

RAID1 is a method which writes the same data to a plurality of storage devices and reads the data from one of the storage devices as needed. As a realization method of RAID1, there is a method which mounts a RAID controller in a server and distributes a read command and a write command from an OS to each storage device by the RAID controller.

The RAID controller which operates in RAID1 holds identicalness of the data by performing the same operation to a plurality of the storage devices which are constituted redundantly. That is, the contents stored in each of the storage devices which are constituted redundantly is the same each other.

The RAID controller often carries a cache memory and has a function which buffers a read data which was read from the storage device and a write data which is written to the storage device. A burst nature at the time of reading a data from the storage device and writing a data to the storage device can be equalized with the cache memory of the RAID controller.

However, when transmitting the write data to the storage device from the cache memory, writing may generate congestion with reading within the storage device. When a free space of the cache memory decreases at the time of writing of the data, the RAID controller will give priority to the writing of the data to the storage device, or will keep a write request from the OS 10 waiting.

It is possible to enlarge memory capacity of the cache memory of the RAID controller. However, even if the cache memory has big memory capacity, when performing writing a data from the cache memory to the storage device, a read delay is not avoided which is caused by the congestion of the writing and reading generated within the storage device.

When a general-purpose SSD is used especially for the storage device, since a controller inside the SSD performs the wear leveling and garbage collection autonomously, a delay problem peculiar to the SSD occurs.

Then, in the second embodiment, a content server which uses RAID1 is explained. FIG. 4 shows the configuration of the content server for distributing video of the second embodiment.

The content server 1 of the second embodiment is a computer provided with a hard disk drive, a memory, a CPU, an external communication interface, etc.

Figure 4:
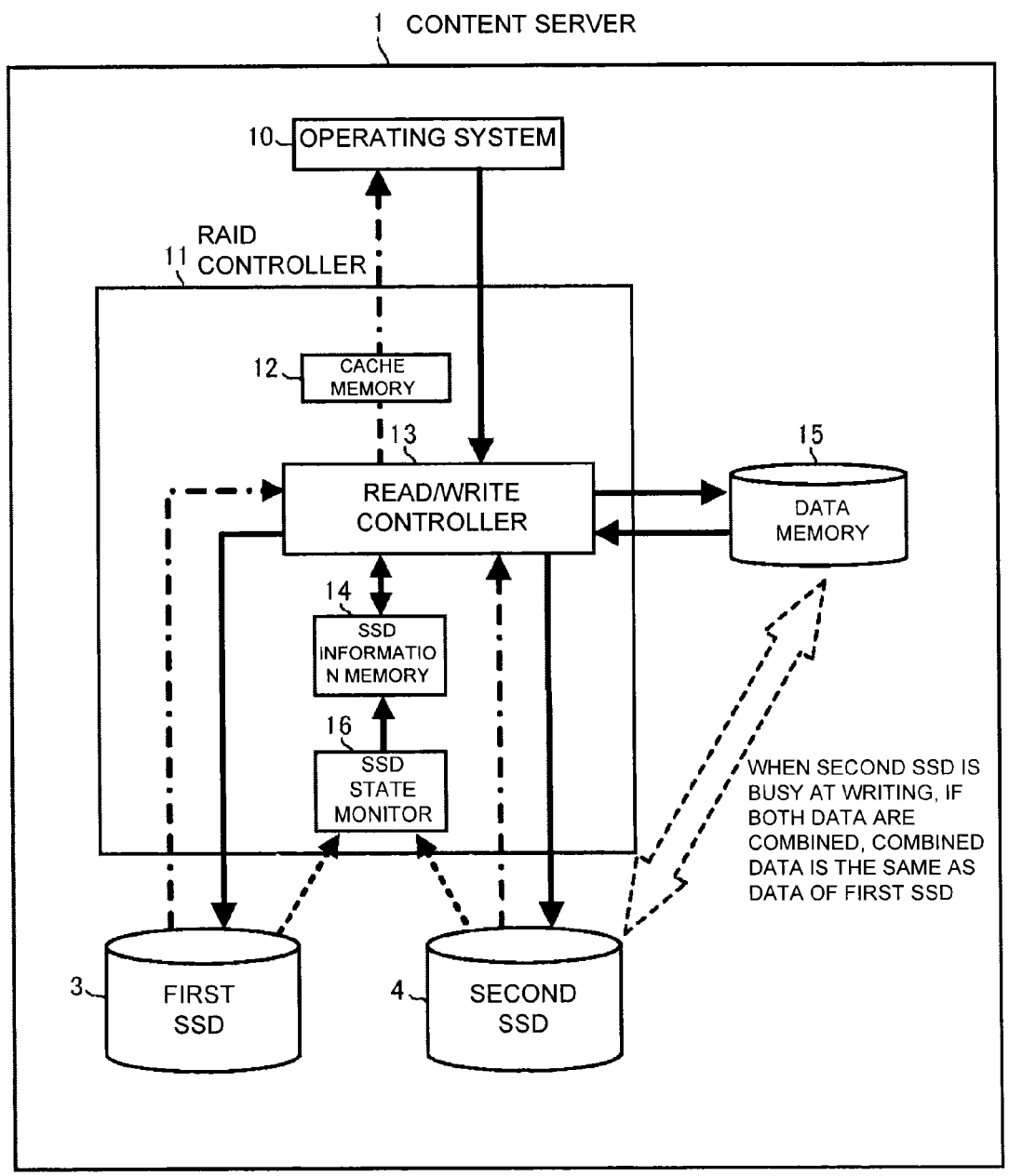
FIG. 4 shows the configuration of a content server of a second embodiment.

As shown in FIG. 4, functionally, this content server 1 is provided with a first SSD 3, a second SSD 4, an OS 10, an RAID controller 11, and a data memory 15, etc.

The data memory 15 is connected to the RAID controller 11 via an interface in a detachable manner. The data memory 15 is a flash memory, for example. That is, the data memory 15 is exchangeable and a data memory capacity can be changed if needed by exchanging the data memory 15.

The RAID controller 11 has a cache memory 12, a read/write controller 13 as a controller, an SSD information memory 14 as an operating state memory, and an SSD state monitor 16.

The OS 10 is basic software installed in the hard disk drive and generates a request to the SSDs, such as a data read request, a data write request.

The OS 10 has the same function as the OS 10 of the first embodiment. That is, in response to instructions from a user of a client terminal (a requestor) connected to a network, for example, the OS 10 sends the data read request to the SSD and delivers a data obtained from the SSD to the requestor through the network. Thus, the OS 10 realizes a video-delivery function by the content server 1.

The cache memory 12 is a memory for holding temporarily a data which is used for distribution and is read from either of the first SSD 3 and the second SSD 4, and for transmitting the data at desired timing.

The first SSD 3 and the second SSD 4 have a flash memory, respectively. In response to the request from the OS 10, the first SSD 3 and the second SSD 4 read a data stored in the flash memory, and write a data to the flash memory.

In the SSD information memory 14, an ID of write-priority SSD and an ID of read-priority SSD are beforehand set up. That is, the SSD information memory 14 stores the ID of write-priority SSD, and the ID of read-priority SSD. In this embodiment, the first SSD 3 is set up as the write-priority SSD and the second SSD 4 is set up as the read-priority SSD, for example.

In addition, in the SSD information memory 14, an operating state of the first SSD 3 and an operating state of the second SSD 4 are set up. That is, the SSD information memory 14 stores the operating state of the first SSD 3 and the operating state of the second SSD 4. In the SSD information memory 14, a state flag which shows the operating state, such as during writing, during reading, during internal processing and standby, is set up for every SSD. For example, since the SSD cannot be accessed from the exterior during a processing period of writing, reading or internal processing, the SSD is busy during those processing periods.

The SSD state monitor 16 always monitors the first SSD 3 and the second SSD 4 to detect the operating state (busy or not) of each of the first SSD 3 and the second SSD 4, and sets up the operating states in the SSD information memory 14.

The data memory 15 is capable of holding temporarily the data which should be written to the first SSD 3 and the second SSD 4, and the data which was read from the first SSD 3 or the second SSD 4 and should be transmitted to a requestor.

When the read/write controller 13 receives a write request or a read request from the OS 10, the read/write controller 13 refers to settings of the operating states of the first SSD 3 and second SSD 4 stored in the SSD information memory 14 and checks the operating states of the first SSD 3 and second SSD 4.

When the request is a write request and both the first SSD 3 and the second SSD 4 are not busy, a write target data is written to the first SSD 3 and the second SSD 4 almost simultaneously.

In addition, when the request is a write request and one SSD (the first SSD 3 or the second SSD 4) is busy, the read/write controller 13 writes the write target data to the SSD of not busy and the data memory 15. In addition, the read/write controller 13 writes the write target data of the data memory 15 to the SSD of busy which is now not busy after the SSD of busy becomes not busy.

In this example, since the first SSD 3 is set up as a write-priority volume, it is rare for the first SSD 3 to be busy when a write request arises. When the second SSD 4 is busy, the write target data is written to the first SSD 3 and the data memory 15.

Then, the read/write controller 13 writes the write target data of the data memory 15 to the second SSD 4 after the second SSD 4 becomes not busy.

When the request is a read request and both the SSDs are not busy, the read/write controller 13 reads a read target data from the second SSD 4 which is set up as the read-priority volume, and the OS 10 transmits it to the requestor.

Note that, when the request is a read request, the first SSD 3 is not busy and the second SSD 4 is busy, the read/write controller 13 reads the read target data from the first SSD 3 which is not a read-priority volume, and the OS 10 transmits it to the requestor.

Figure 5:
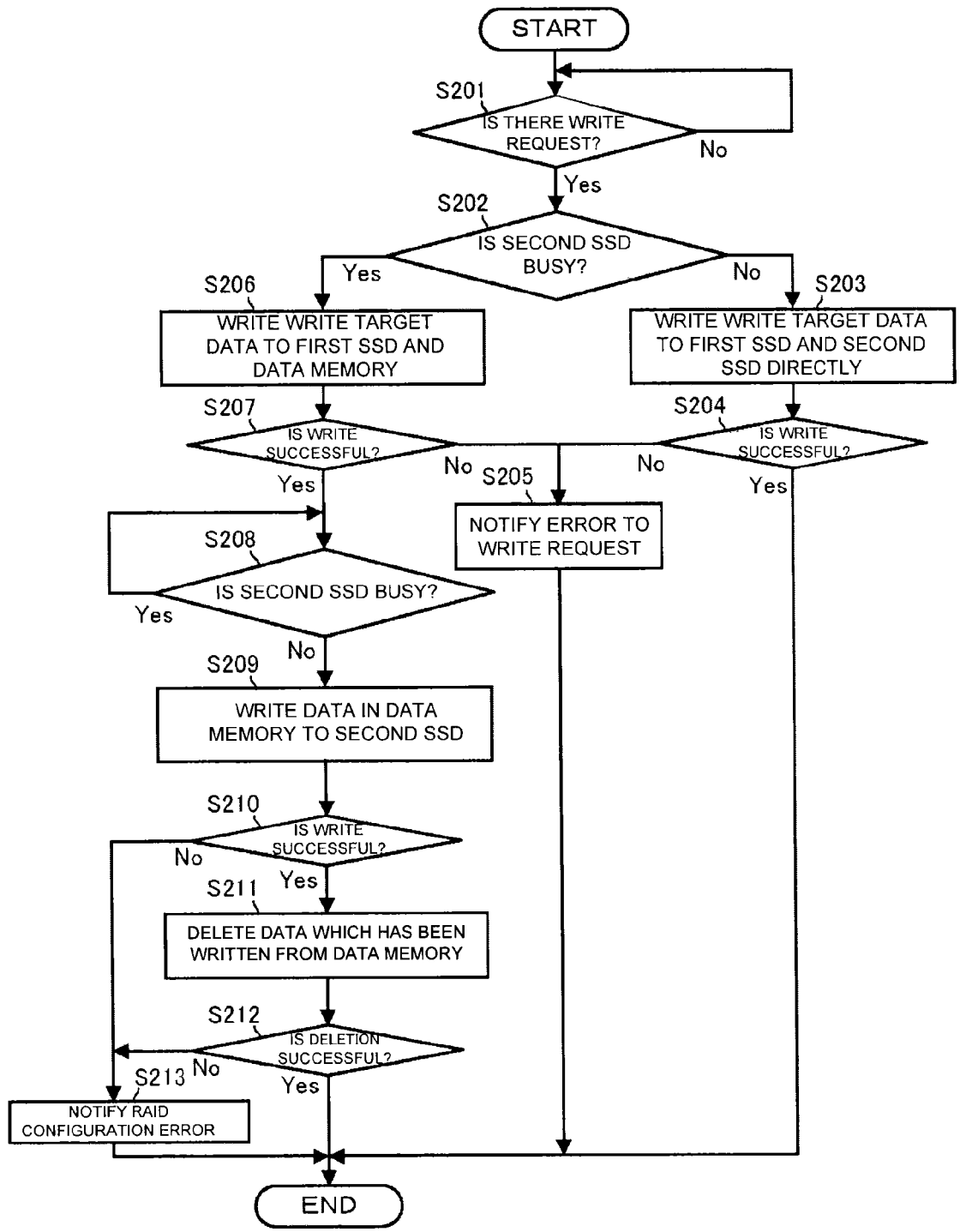
FIG. 5 shows a flow chart which shows a write operation of the content server of the second embodiment.
Figure 6:
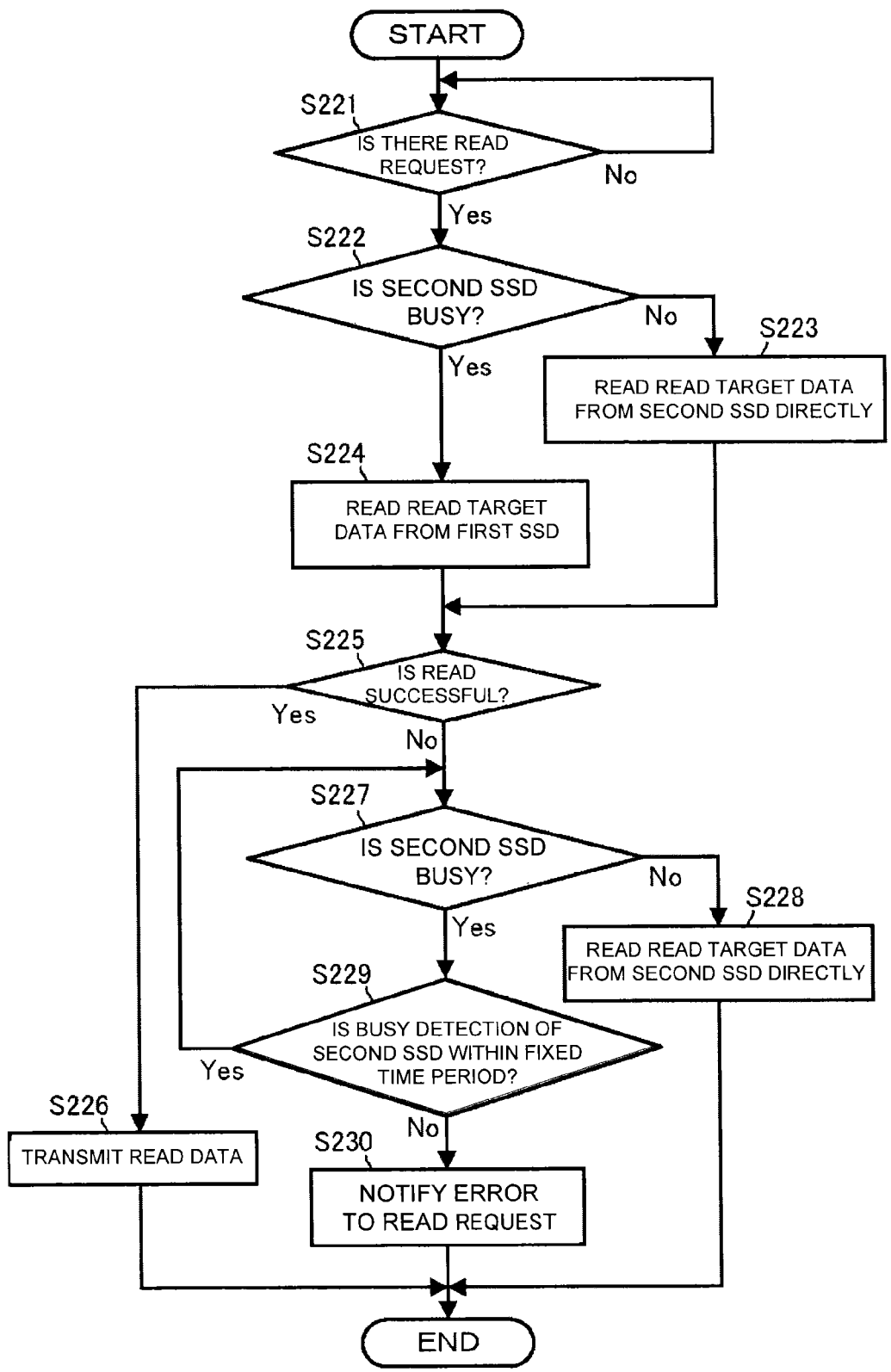
FIG. 6 shows a flow chart which shows a read operation of the content server of the second embodiment.

Then, the operation of the content server of the second embodiment is explained with reference to flow charts of FIG. 5 and FIG. 6. The operation is explained about a first case where a data write request occurs, a second case where a data read request occurs and a third case other than the first case and the second case.

<First Case where a Data Write-in Request Occurs>

The operation is explained with reference to FIG. 5. When the read/write controller 13 receives a data write request from the OS 10 (Yes of Step S201), the read/write controller 13 refers to the settings of the operating states of the first SSD 3 and the second SSD 4 stored in the SSD information memory 14, and checks the operating states of the first SSD 3 and the second SSD 4 (Step S202).

When the second SSD 4 is not busy as a result of Step S202 (No of Step S202), the read/write controller 13 writes a write target data to the first SSD 3 and the second SSD 4 directly (Step S203).

The read/write controller 13 checks a result of the writing of the write target data (Step S204).

When the writing of the write target data is successful as a result of Step S204 (Yes of Step S204), a processing is ended at the time.

When the writing of the write target data fails, that is, the writing of the write target data is not successful as a result of Step S204 (No of Step S204), an error to the write request is notified to the OS 10 (Step S205).

On the other hand, when the second SSD 4 is busy as a result of Step S202 (Yes of Step S202), the read/write controller 13 writes the write target data to the first SSD 3 and the data memory 15 (Step S206).

The read/write controller 13 checks a result of the writing of the write target data (Step S207).

When the writing of the write target data is successful as a result of Step S207 (Yes of Step S207), the read/write controller 13 refers to settings of the operating state of the second SSD 4 stored in the SSD information memory 14 and checks the operating state of the second SSD 4 (Step S208).

When the writing of the write target data fails, that is, the writing of the write target data is not successful as a result of Step S207 (No of Step S207), the read/write controller 13 notifies an error to the write request to the OS 10 (Step S205).

When the second SSD 4 is busy as a result of Step S208 (Yes of Step 208), the read/write controller 13 waits until the second SSD 4 becomes not busy.

When the second SSD 4 is not busy as a result of Step S208 (No of Step S208), the read/write controller 13 writes the write target data currently held in the data memory 15 to the second SSD 4 (Step S209).

And the read/write controller 13 checks a result of the writing of the write target data to the second SSD 4 (Step S210).

When the writing of the write target data is successful as a result of Step S210 (Yes of Step S210), the read/write controller 13 deletes the write target data currently held in the data memory 15 (Step S211).

After deleting the write target data, the read/write controller 13 checks whether the deletion of the write target data is successful (Step S212).

When the deletion of the write target data is successful as a result of Step S212 (Yes of Step S212), a processing about this request will be ended.

On the other hand, when the writing of the write target data fails, that is, the writing of the write target data is not successful as a result of Step S210 (No of Step S210), or the deleting of the write target data is not successful as a result of Step S212 (No of Step S212), the read/write controller 13 notifies an RAID configuration error to the write request to the OS 10 (Step S213).

<Second Case where a Data Read Request Occurs>

The operation is explained with reference to FIG. 6. When the read/write controller 13 receives a data read request from the OS 10 (Yes of Step S221), the read/write controller 13 refers to settings of the first SSD 3 and the second SSD 4 stored in the SSD information memory 14 and checks the operating states of the first SSD 3 and the second SSD 4 (Step S222).

When the second SSD 4 which is the read-priority volume is not busy as a result of Step S222 (No of Step S222), the read/write controller 13 reads a read target data directly from the second SSD 4 (Step S223).

When the second SSD 4 is busy as a result of Step S222 (Yes of Step S222), the read/write controller 13 reads the read target data from the first SSD 3 which is the write-priority volume (Step S224), and holds it in the cache memory 12 temporarily.

Then, the read/write controller 13 checks whether the read target data was read normally (Step S225).

When the read of the read target data is successful as a result of Step S225 (Yes of Step S225), the read/write controller 13 transmits the read target data to the OS 11 from the cache memory 12 (Step S226).

On the other hand, when the read of the read target data fails, that is, the read of the read target data is not successful as a result of Step S225 (No of Step S225), the read/write controller 13 checks the operating state of the second SSD 4 (Step 227).

When the second SSD 4 which is the read-priority volume is not busy as a result of Step 227 (No of Step S227), the read/write controller 13 reads the read target data directly from the second SSD 4 (Step S228).

When the second SSD 4 is busy as a result of Step 227 (Yes of Step 227), the read/write controller 13 waits for fixed time period until the second SSD 4 becomes not busy (Step S229).

And when a time of detection of the busy state of the second SSD 4 is less than a time (threshold) set up beforehand, that is the time of detection does not exceed a fixed period of time (Yes of Step S229), the read/write controller 13 checks the operating state of the second SSD 4 again (Step S227).

On the other hand, when a busy state continues more than a time set up beforehand as a result of a monitor of a busy time of Step S229 (No of Step S229), the read/write controller 13 notifies an error to the read request to the OS 10 (Step S230). At this time, a result of the operation may be memorized or outputted as a log.

<Third Case Other than the First Case and the Second Case>

At timing without a data read request or a data write request from the OS 11, the read/write controller 13 checks whether the write target data exists in the data memory 15.

When the write target data is held in the data memory 15 as a result of this check, the read/write controller 13 reads the write target data from the data memory 15 and writes it to the second SSD 4.

When the writing of the write target data is successful, the read/write controller 13 deletes the write target data existing in the data memory 15 which was written to the second SSD 4.

When the writing of the write target data of the data memory 15 to the second SSD 4 fails or the deleting of the write target data of the data memory 15 which was written to the second SSD 4 fails, an error which shows that thing is notified to the OS 10. In addition, at this time, a result of the operation may be stored to a predetermined storage area of the hard disk drive or the memory, or may be outputted to the outside as a log.

Thus, according to this second embodiment, in addition to the same effect as the effect of the first embodiment that the delay does not arise in reading of the contents, a writing and reading of contents can be performed by the RAID1 using a plurality of general-purpose SSDs (the first SSD 3 and the second SSD 4).

According to one of the embodiments, as mentioned above, the server using the general-purpose SSD which does not produce a delay in read of contents can be provided. In addition, a drive control device for the general-purpose SSD which has the read/write controller and does not produce a delay in read of contents, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The constituent elements shown in the embodiment may be implemented by programs installed in a storage device of a computer such as a hard disk drive. Such programs may be stored in a computer-readable electronic medium, and a computer is caused to read the programs from the electronic medium to implement the functions of the present invention. Examples of the electronic medium include recording media such as CD-ROMs, flash memories, and removable media. Furthermore, the functions of the present invention may be implemented by distributing and storing the constituent components in different computers connected via a network and causing the computers functioning as the constituent components to communicate with each other.

What is claimed is:

1. A drive control device, comprising:
a monitor which monitors an operating state of a solid-state drive and detects whether the solid-state drive is busy;
a data memory which is capable of holding temporarily a write target data which should be written to the solid-state drive or a read target data which was read from the solid-state drive and should be transmitted to a requestor;
a controller which writes the write target data to the data memory when the controller receives a write request and the monitor detects that the solid-state drive is busy, and which writes the write target data held in the data memory to the solid-state drive after the solid-state drive becomes not busy,
wherein the controller writes the write target data directly to the solid-state drive without performing writing of the write target data to the data memory and reading of the write target data from the data memory when the monitor detects that the solid-state drive is not busy.

2. The drive control device according to claim 1, wherein the controller reads the read target data from the data memory which was read from the solid-state drive beforehand and has been held in the data memory, and transmits the read target data to the requestor when the controller receives a read request and the monitor detects that the solid-state drive is busy.

3. A drive control device, comprising:
a monitor which monitors an operating state of a solid-state drive of write-priority and an operating state of a solid-state drive of read-priority, and detects whether each solid-state drive is busy;
a data memory which is capable of holding temporarily a write target data which should be written to the solid-state drives or a read target data which was read from one of the solid-state drives and should be transmitted to a requestor;
a controller which writes the write target data to the solid-state drive of write-priority and the data memory when the controller receives a write request and the monitor detects that the solid-state drive of read-priority is busy, and which writes the write target data held in the data memory to the solid-state drive of read-priority after the solid-state drive of read-priority becomes not busy,
wherein the controller writes the write target data directly to the solid-state drive of read-priority, without performing writing of the write target data to the data memory and reading of the write target data from the data memory when the monitor detects that the solid-state drive of read-priority is not busy.

4. The drive control device according to claim 3, wherein the controller reads the read target data from the solid-state drive of write-priority and transmits the read target data to the requestor when the controller receives a read request and the monitor detects that the solid-state drive of read-priority is busy.

5. A server, comprising:
a solid-state drive;
a monitor which monitors an operating state of the solid-state drive and detects whether the solid-state drive is busy;
a data memory which is capable of holding temporarily a write target data which should be written to the solid-state drive or a read target data which was read from the solid-state drive and should be transmitted to a requestor;
a controller which writes the write target data to the data memory when the controller receives a write request and the monitor detects that the solid-state drive is busy, and which writes the write target data held in the data memory to the solid-state drive after the solid-state drive becomes not busy, wherein the controller writes the write target data directly to the solid-state drive, without performing writing of the write target data to the data memory and reading of the write target data from the data memory when the monitor detects that the solid-state drive is not busy.

6. The server according to claim 5, wherein the controller reads the read target data from the data memory which was read from the solid-state drive beforehand and has been held in the data memory, and transmits the read target data to the requestor when the controller receives a read request and the monitor detects that the solid-state drive is busy.

7. A server, comprising:
a solid-state drive of write-priority;
a solid-state drive of read-priority;
a monitor which monitors an operating state of the solid-state drive of write-priority and an operating state of the solid-state drive of read-priority, and detects whether each solid-state drive is busy;
a data memory which is capable of holding temporarily a write target data which should be written to the solid-state drives or a read target data which was read from one of the solid-state drives and should be transmitted to a requestor;
a controller which writes the write target data to the solid-state drive of write-priority and the data memory when the controller receives a write request and the monitor detects that the solid-state drive of read-priority is busy, and which writes the write target data held in the data memory to the solid-state drive of read-priority after the solid-state drive of read-priority becomes not busy,
wherein the controller writes the write target data directly to the solid-state drive of read-priority, without performing writing of the write target data to the data memory and reading of the write target data from the data memory when the monitor detects that the solid-state drive of read-priority is not busy.

8. The server according to claim 7, wherein the controller reads the read target data from the solid-state drive of write-priority when the controller receives a read request and the monitor detects that the solid-state drive of read-priority is busy.

9. The server computer according to claim 7, comprising further a solid-state drive information memory in which an operating state of a particular solid-state drive is set up; wherein the controller checks the operating state of the particular solid-state drive with reference to the solid-state drive information memory when the controller receives the write request or a read request.

* * * * *